(12) United States Patent
Zhang et al.

(10) Patent No.: US 11,314,155 B1
(45) Date of Patent: Apr. 26, 2022

(54) ELEVATOR ASSEMBLY AND ELECTRONIC DEVICE

(71) Applicant: Wistron Corporation, New Taipei (TW)

(72) Inventors: Weijie Zhang, New Taipei (TW); Dong-Ying Chen, New Taipei (TW); Yuanqing Liu, New Taipei (TW); HuiQiang He, New Taipei (TW)

(73) Assignee: Wistron Corporation, New Taipei (TW)

( * ) Notice: Subject to any disclaimer, the term of this patent is extended or adjusted under 35 U.S.C. 154(b) by 7 days.

(21) Appl. No.: 17/118,607

(22) Filed: Dec. 11, 2020

(30) Foreign Application Priority Data

Oct. 15, 2020  (CN) .......................... 202011101776.4

(51) Int. Cl.
| | | |
|---|---|---|
| *G03B 17/00* | (2021.01) | |
| *G03B 17/56* | (2021.01) | |
| *F16M 13/02* | (2006.01) | |
| *F16H 19/04* | (2006.01) | |
| *F16H 21/44* | (2006.01) | |

(52) U.S. Cl.
CPC ........... *G03B 17/561* (2013.01); *F16H 21/44* (2013.01); *F16M 13/022* (2013.01); *F16M 2200/048* (2013.01)

(58) Field of Classification Search
USPC ...................................................... 396/428
See application file for complete search history.

(56) References Cited

U.S. PATENT DOCUMENTS

| | | | | |
|---|---|---|---|---|
| 8,950,125 | B2 * | 2/2015 | Kensinger ............. | E04H 12/187 52/114 |
| 10,030,379 | B2 * | 7/2018 | Kensinger ............. | E04H 12/185 |
| 10,465,841 | B1 * | 11/2019 | Gan ....................... | F16M 13/02 |
| 10,604,928 | B2 * | 3/2020 | Kensinger ........... | E04B 1/34305 |
| 2019/0316733 | A1 | 10/2019 | Gan | |

FOREIGN PATENT DOCUMENTS

| | | |
|---|---|---|
| CN | 110388540 | 10/2019 |
| CN | 111412355 | 7/2020 |

OTHER PUBLICATIONS

"Office Action of Taiwan Counterpart Application", dated Aug. 16, 2021, p. 1-p. 8.

* cited by examiner

*Primary Examiner* — Clayton E. LaBelle
*Assistant Examiner* — Warren K Fenwick
(74) *Attorney, Agent, or Firm* — JCIPRNET

(57) ABSTRACT

An elevator assembly includes a first bracket, a second bracket, a first connecting rod and a second connecting rod. The second bracket is slidably disposed on the first bracket. The first connecting rod has a first pivot end and a first sliding end. The first pivot end is pivoted to the first bracket and provided with a first gear portion, and the first sliding end is slidably disposed on the first bracket and connected to the second bracket. The second connecting rod has a second pivot end and a second sliding end. The second pivot end is pivoted to the first bracket and provided with a second gear portion, the second sliding end is slidably disposed on the second bracket and connected to the second bracket, and the first gear portion and the second gear portion are engaged with each other.

20 Claims, 14 Drawing Sheets

ELEVATOR ASSEMBLY AND ELECTRONIC DEVICE

CROSS-REFERENCE TO RELATED APPLICATION

This application claims the priority benefit of China application no. 202011101776.4, filed on Oct. 15, 2020. The entirety of the above-mentioned patent application is hereby incorporated by reference herein and made a part of this specification.

TECHNICAL FIELD

The invention relates to an elevator assembly and an electronic device, and more particularly, relates to an elevator assembly that can be connected to an image capturing unit and an electronic device having the elevator assembly.

BACKGROUND

For most of all-in-one PCs (AIO PCs), an image capturing unit is disposed on top of a body at a frame above a display surface, and is generally installed directly in the frame or assembled on the frame in form of module. The image capturing unit directly installed in the frame will increase a frame width, which goes against the current narrow frame design trend. The image capturing unit assembled on the frame in form of module is visually obtrusive.

To overcome the above-mentioned problems, in some AIO PCs, the image capturing unit is designed to be lifted and lowered by an elevator assembly and can be hidden when not in use to provide a better appearance for the body. However, the general elevator assembly is prone to moving up and down asynchronously due to uneven force applied on the left and right ends by the user, so the elevator assembly may not be operated smoothly. Some elevator assemblies have added scissor feet and other complicated structures to improve the smoothness of operation, but the difficulty of assembly and the cost of equipment will be significantly increased.

SUMMARY

The invention provides an elevator assembly, which improves the smoothness of operation by a simple structure.

The invention provides an electronic device with an elevator assembly having a simple structure to improve the smoothness of operation.

The elevator assembly of the invention includes a first bracket, a second bracket, a first connecting rod and a second connecting rod. The second bracket is slidably disposed on the first bracket. The first connecting rod has a first pivot end and a first sliding end. The first pivot end is pivoted to the first bracket and provided with a first gear portion, and the first sliding end is slidably disposed on the first bracket and connected to the second bracket. The second connecting rod has a second pivot end and a second sliding end. The second pivot end is pivoted to the first bracket and provided with a second gear portion, the second sliding end is slidably disposed on the second bracket and connected to the second bracket, and the first gear portion and the second gear portion are engaged with each other.

The electronic device of the invention includes a device body, an image capturing unit and an elevator assembly. The elevator assembly includes a first bracket, a second bracket, a first connecting rod and a second connecting rod. The first bracket is disposed on the device body. The second bracket is slidably disposed on the first bracket. The image capturing unit is disposed on the second bracket. The first connecting rod has a first pivot end and a first sliding end. The first pivot end is pivoted to the first bracket and provided with a first gear portion, and the first sliding end is slidably disposed on the first bracket and connected to the second bracket. The second connecting rod has a second pivot end and a second sliding end. The second pivot end is pivoted to the first bracket and provided with a second gear portion, the second sliding end is slidably disposed on the second bracket and connected to the second bracket, and the first gear portion and the second gear portion are engaged with each other.

In an embodiment of the invention, a first sliding portion and a second sliding portion are respectively provided at two ends of the first bracket, the second bracket is slidably disposed on the first sliding portion and the second sliding portion, the first connecting rod is located between the first sliding portion and the second connecting rod, and the second connecting rod is located between the second sliding portion and the first connecting rod.

In an embodiment of the invention, the first sliding end is adjacent to the first sliding portion and located between the first sliding portion and the first pivot end, and the second sliding end is adjacent to the second sliding portion and located between the second sliding portion and the second pivot end.

In an embodiment of the invention, at least one of the first sliding portion and the second sliding portion includes a roller or a sliding block.

In an embodiment of the invention, two sliding rails are respectively provided at two ends of the second bracket, and the first sliding portion and second sliding portion are respectively slidably disposed on the two sliding rails.

In an embodiment of the invention, at least one of the first sliding portion and the second sliding portion includes a plurality of rollers, the corresponding sliding rail has a first inner wall and a second inner wall opposite to each other, a part of the rollers contacts the first inner wall and has a distance from the second inner wall, and another part of the rollers contacts the second inner wall and has a distance from the first inner wall.

In an embodiment of the invention, the elevator assembly further includes a damper bearing. The damper bearing is connected between the first pivot end and the first bracket.

In an embodiment of the invention, the second bracket is provided with a first convex post and a second convex post, the first bracket is provided with a first sliding slot and a second sliding slot, the first sliding end of the first connecting rod is provided with a third sliding slot, the second sliding end of the second connecting rod is provided with a fourth sliding slot, the first convex post is inserted to the first sliding slot and the third sliding slot, and the second convex post is inserted to the second sliding slot and the fourth sliding slot.

In an embodiment of the invention, the elevator assembly further includes an elastic component. The elastic component is connected between the first connecting rod and the second connecting rod, and the second bracket is adapted to be positioned at a first position or a second position through an elastic force of the elastic component and adapted to resist the elastic force of the elastic component to move to a third position between the first position and the second position.

In an embodiment of the invention, a first cylinder is provided on the first connecting rod, a second cylinder is provided on the second connecting rod, the first bracket is provided with two arc slots, and the first cylinder and the second cylinder are respectively inserted to the two arc slots and respectively connected to two opposite ends of the elastic component.

In an embodiment of the invention, the elevator assembly further includes two elastic components. One of the elastic components is connected between the first connecting rod and the first bracket, the other one of the elastic components is connected between the second connecting rod and the first bracket, and the second bracket is adapted to be positioned at a first position or a second position through elastic forces of the two elastic components and adapted to resist the elastic forces of the two elastic components to move to a third position between the first position and the second position.

In an embodiment of the invention, the elevator assembly further includes a push-push mechanism. The push-push mechanism is partially disposed on the second bracket, and the second bracket is adapted to be positioned at the first bracket through the push-push mechanism.

In an embodiment of the invention, the elevator assembly further includes a push-push mechanism. A part of the push-push mechanism is disposed on the second bracket, another part of the push-push mechanism is disposed on the device body, and the elevator assembly is adapted to be positioned at the device body through the push-push mechanism.

In an embodiment of the invention, the elevator assembly further includes at least one elastic component. The at least one elastic component is connected to the second bracket, and when the push-push mechanism releases the second bracket, the second bracket is adapted to slide relative to the first bracket through an elastic force of the at least one elastic component.

In an embodiment of the invention, the elevator assembly further includes at least one elastic component. The at least one elastic component is connected between the device body and the second bracket, and when the push-push mechanism releases the second bracket, the second bracket is adapted to slide relative to the device body and the first bracket through an elastic force of the at least one elastic component.

Based on the above, in the elevator assembly of the invention, the first connecting rod and the second connecting rod that can be synchronously moved are disposed between the first bracket and the second bracket slidably disposed on each other. Therefore, in the process during which the second bracket slides relative to the first bracket, the left and right ends of the second bracket can be synchronously lifted and lowered by the link relationship of the first connecting rod and the second connecting rod. Therefore, the elevator assembly can be operated smoothly without a complicate structure such as scissor feet to be added to the elevator assembly.

DETAILED DESCRIPTION

Figure 1:
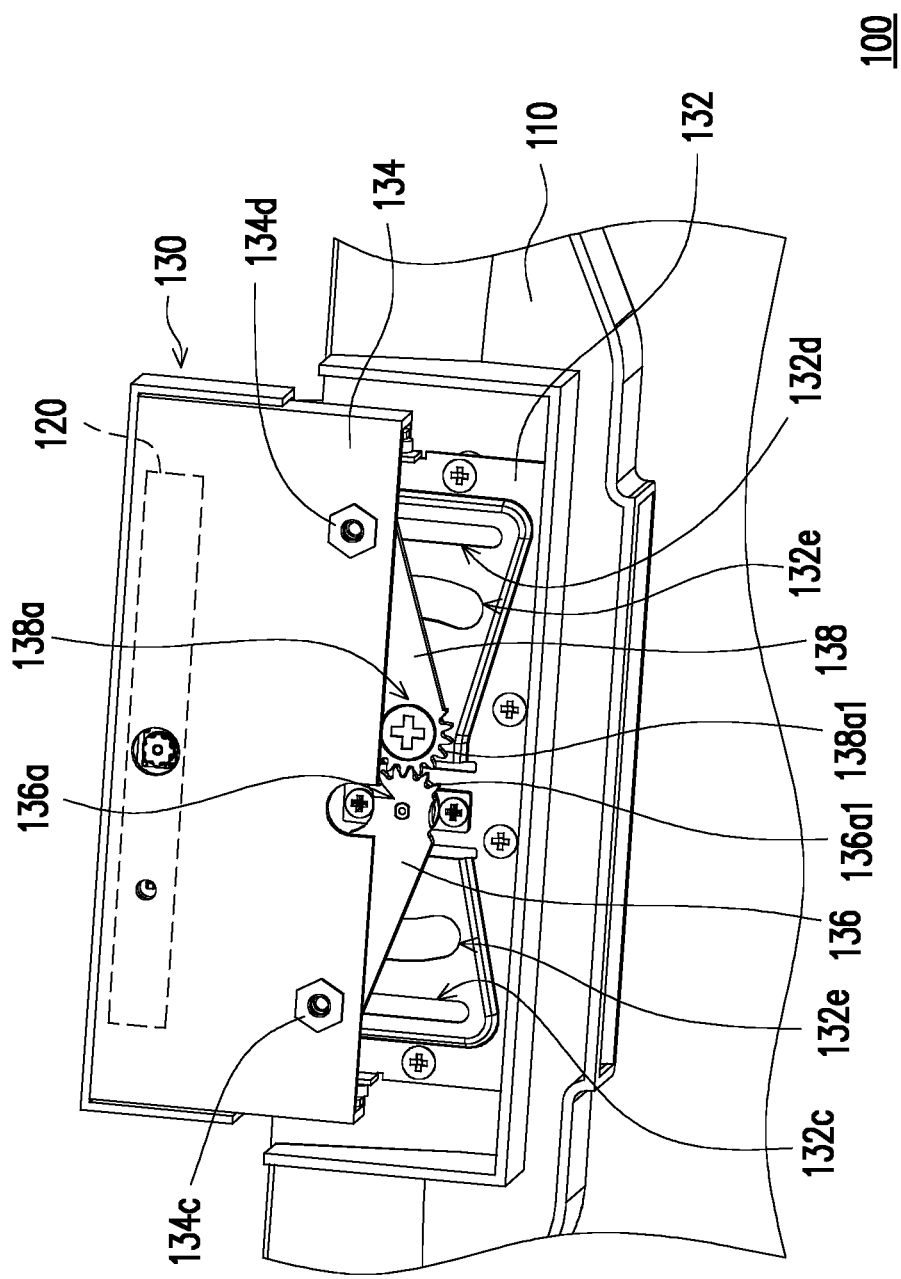
FIG. 1 is a partial 3D view of an electronic device according to an embodiment of the invention.

FIG. 1 is a partial 3D view of an electronic device according to an embodiment of the invention. Referring to FIG. 1, an electronic device 100 of this embodiment is, for example, an all-in-one PC (AIO PC) and includes a device body 110, an image capturing unit 120 and an elevator assembly 130. The elevator assembly 130 is disposed on the device body 110. The image capturing unit 120 is disposed on the elevator assembly 130 and can be lifted or lowered relative to the device body 110 through an operation of the elevator assembly 130.

Figure 2:
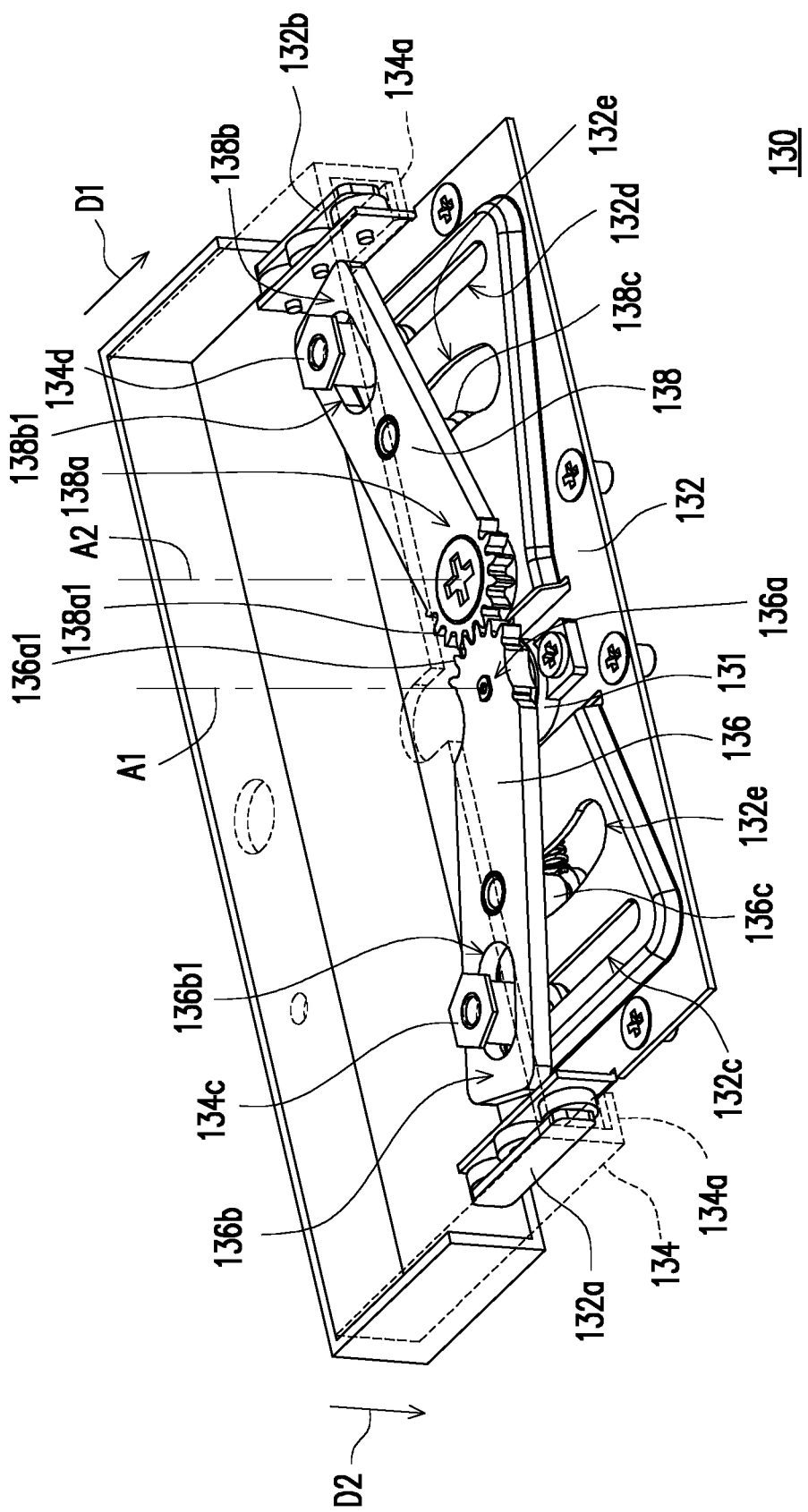
FIG. 2 is a 3D view of an elevator assembly of FIG. 1.
Figure 3:
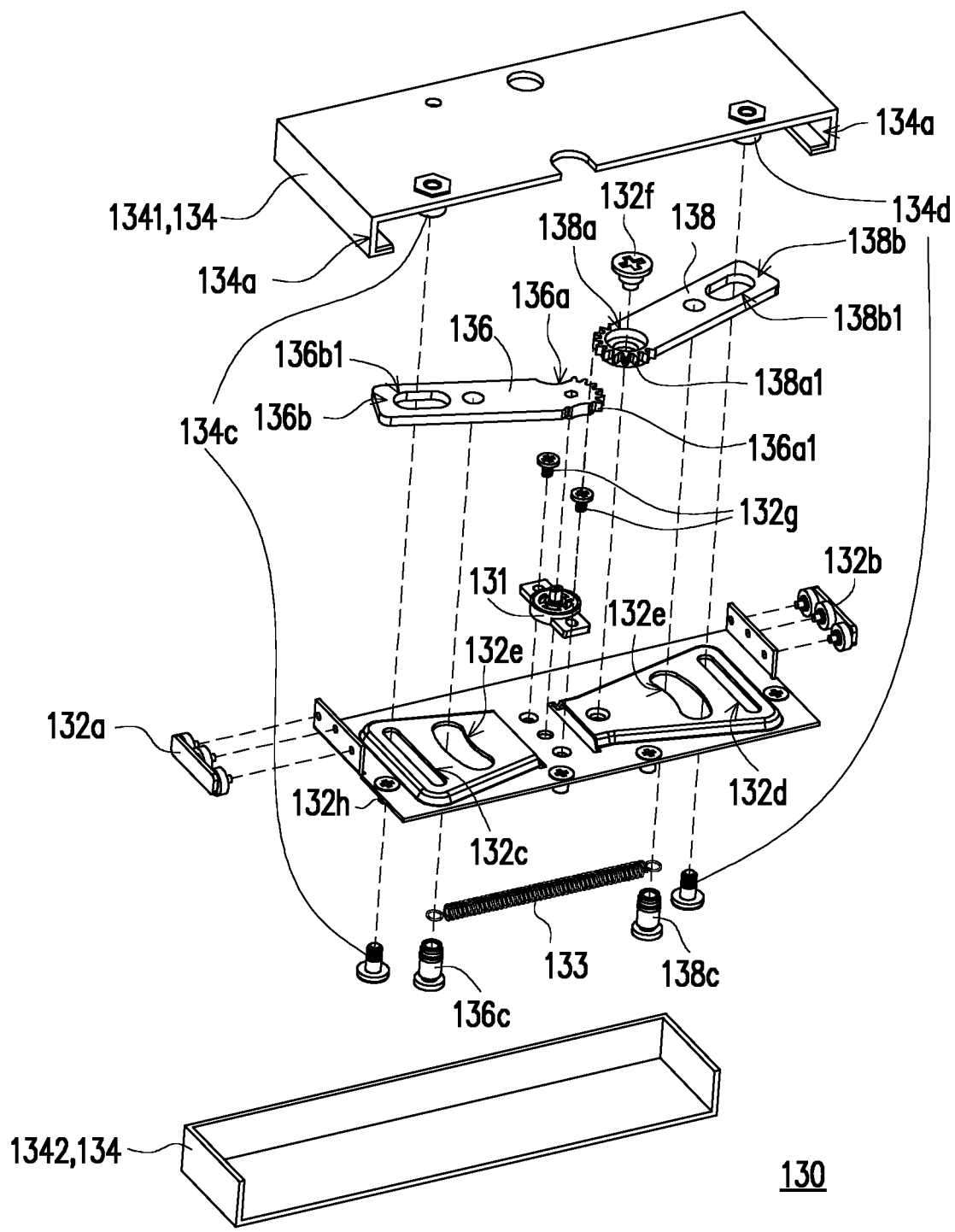
FIG. 3 is an exploded view of the elevator assembly of FIG. 2.

FIG. 2 is a 3D view of an elevator assembly of FIG. 1. FIG. 3 is an exploded view of the elevator assembly of FIG. 2. Referring to FIG. 1 to FIG. 3, in detail, the elevator assembly 130 includes a first bracket 132, a second bracket 134, a first connecting rod 136 and a second connecting rod 138. The first bracket 132 is provided with a first sliding portion 132$a$ and a second sliding portion 132$b$. The second bracket 134 is slidably disposed on the first sliding portion 132$a$ and the second sliding portion 132$b$ along a first direction D1. The image capturing unit 120 (illustrated in FIG. 1) is disposed on the second bracket 134. The first connecting rod 136 has a first pivot end 136$a$ and a first sliding end 136$b$. The first pivot end 136$a$ is pivotally connected to the first bracket 132 along a first axis A1 perpendicular to the first direction D1 and provided with a first gear portion 136$a$1. The first sliding end 136$b$ is slidably disposed on the first bracket 132 along the first direction D1 and connected to the second bracket 134. The second connecting rod 138 has a second pivot end 138$a$ and a second sliding end 138$b$. The second pivot end 138$a$ is pivotally connected to the first bracket 132 along a second axis A2 perpendicular to the first direction D1 and provided with a second gear portion 138$a$1. The second sliding end 138$b$ is slidably disposed on the first bracket 132 along the first direction D1 and connected to the second bracket 134. The first gear portion 136$a$1 and the second gear portion 138$a$1 are engaged with each other.

Figure 4A:
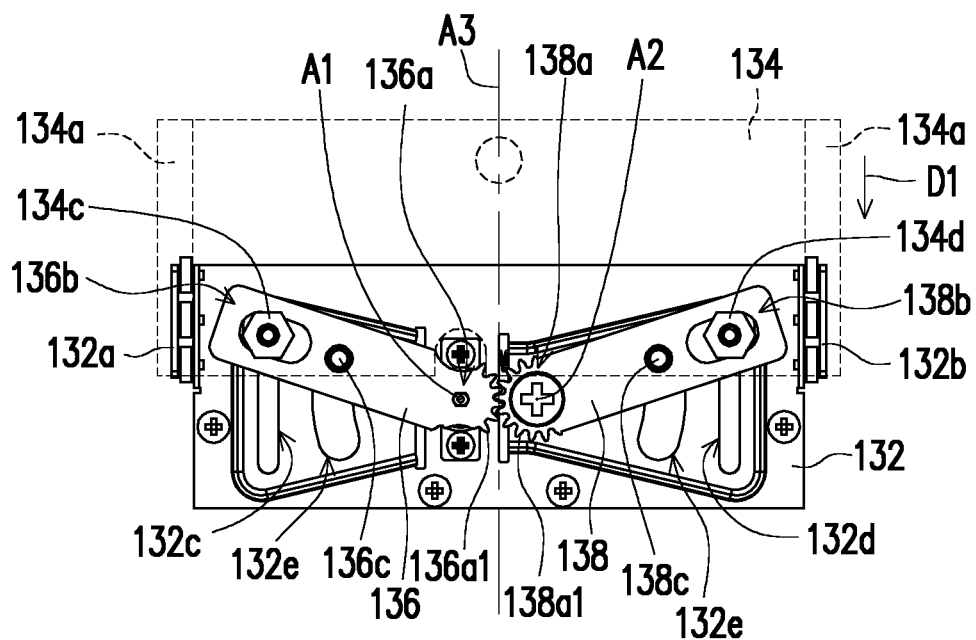
FIG. 4A to FIG. 4C illustrate how a second bracket of FIG. 2 slides relative to a first bracket.
Figure 4B:
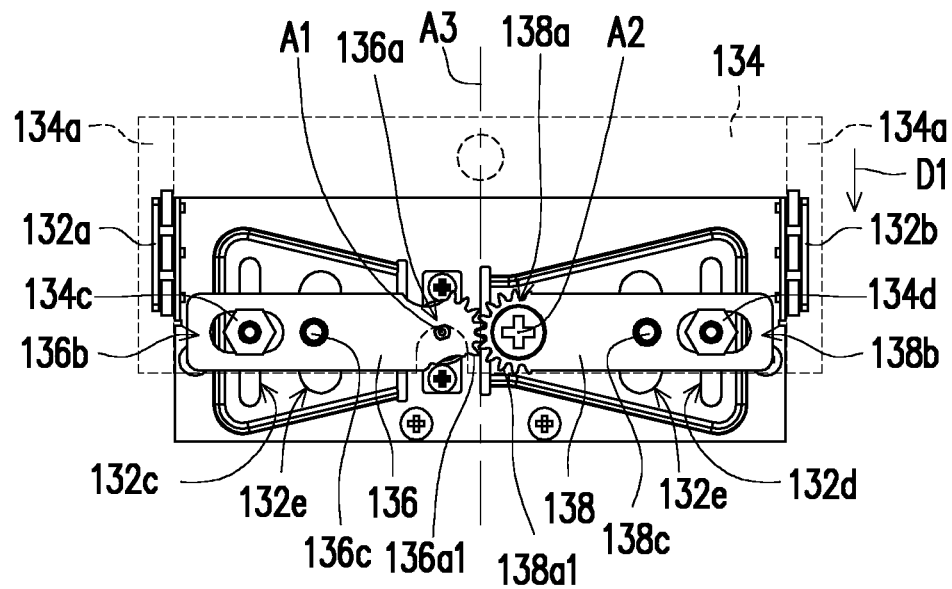
Figure 4C:
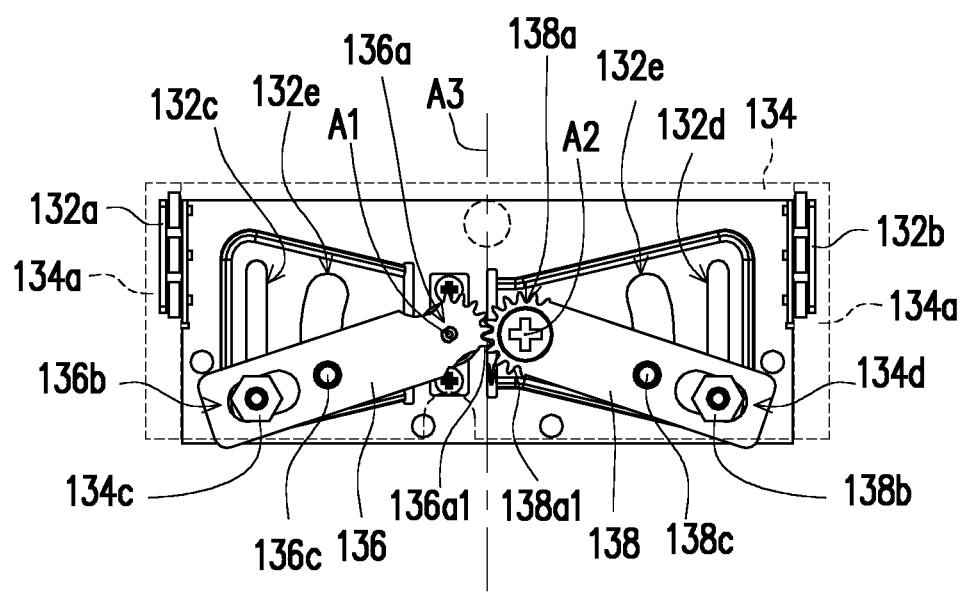
Figure 5A:
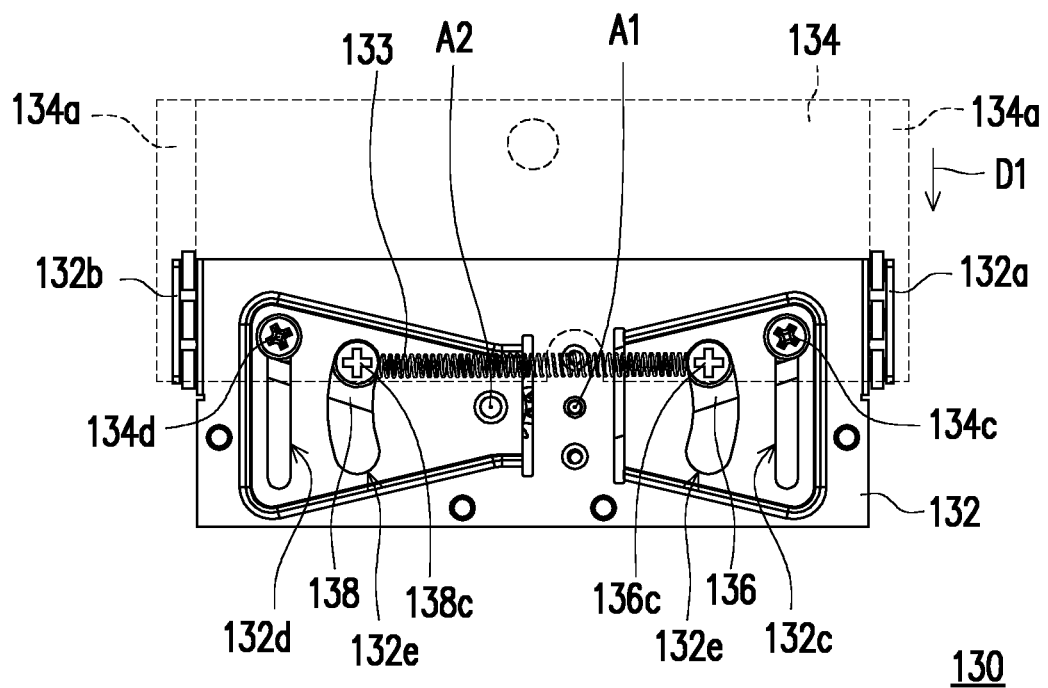
FIG. 5A to FIG. 5C are back views of FIG. 4A to FIG. 4C, respectively.
Figure 5B:
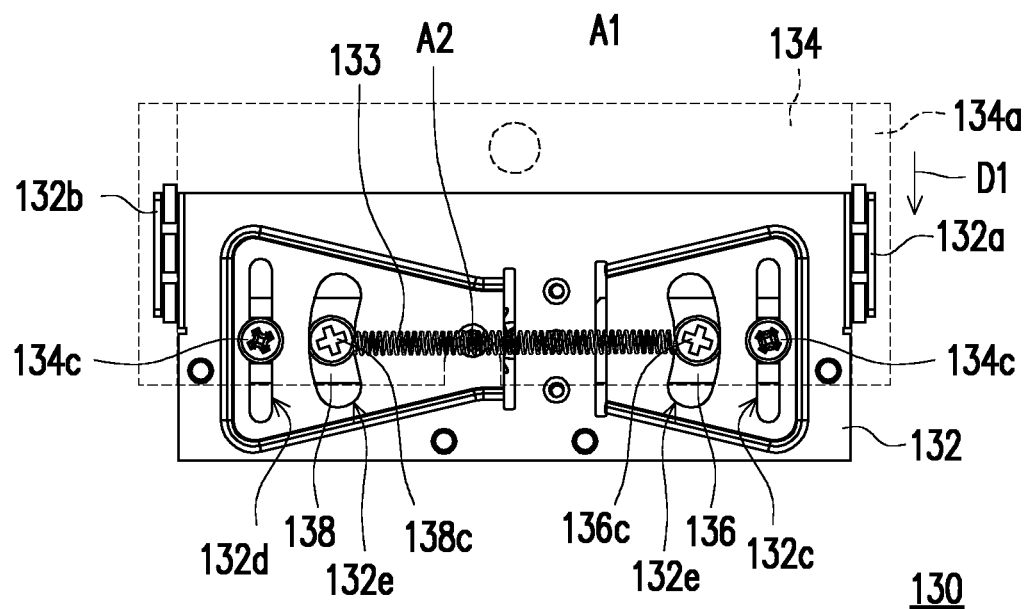
Figure 5C:
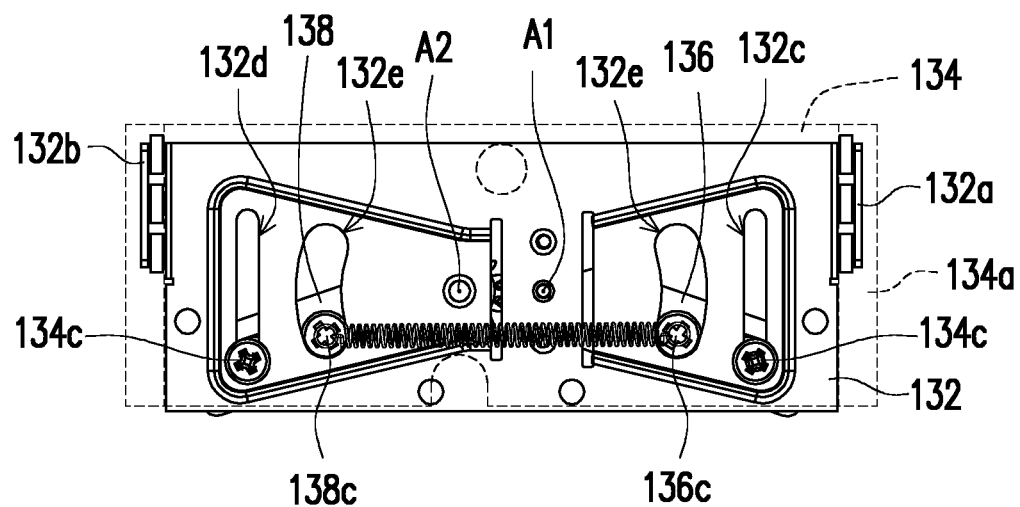

FIG. 4A to FIG. 4C illustrate how a second bracket of FIG. 2 slides relative to a first bracket. FIG. 5A to FIG. 5C are back views of FIG. 4A to FIG. 4C, respectively. In this embodiment, as described above, the first connecting rod 136 and the second connecting rod 138 that can be synchronously moved are disposed between the first bracket 132 and the second bracket 134 slidably disposed on each other. Accordingly, in the process during which the second bracket 134 slides relative to the first bracket 132 as shown by FIG. 4A to FIG. 4C or FIG. 4C to 4A, the first gear portion 136$a$1 of the first connecting rod 136 and the second gear portion 138$a$1 of the second connecting rod 138 drive each other, so that the first sliding end 136*b* of the first connecting rod 136 and the second sliding end 138*b* of the second connecting rod 138 can synchronously slide along the first bracket 132 through a link relationship of the first connecting rod 136 and the second connecting rod 138. In this way, even if the user applies uneven left and right forces on the second bracket 134, the left and right ends of the second bracket 134 can still be lifted and lowered synchronously. Therefore, the elevator assembly 130 can be operated smoothly without a complicate structure such as scissor feet to be added to the elevator assembly 130.

Furthermore, the first connecting rod 136 and the second connecting rod 138 of this embodiment are symmetrical to a third axis A3 (marked in FIG. 4A to FIG. 4C). The third axis A3 is parallel to the first direction D1 and overlaps a geometric center of the first bracket 132 and a geometry center of the second bracket 134 in a second direction D2 (marked in FIG. 2) parallel to the first axis A1. Accordingly, the first connecting rod 136 and the second connecting rod 138 arranged in a bilaterally symmetrical manner in the elevator assembly 130 can reliably assist the left and right ends of the second bracket 134 to slide synchronously.

Further, in this embodiment, the first connecting rod 136 is located between the first sliding portion 132*a* and the second connecting rod 138, and the second connecting rod 138 is located between the second sliding portion 132*b* and the first connecting rod 136. The first sliding end 136*b* is located between the first sliding portion 132*a* and the first pivot end 136*a*, and the second sliding end 138*b* is located between the second sliding portion 132*b* and the second pivot end 138*a*. The first pivot end 136*a* is away from the first sliding portion 132*a* (i.e., a distance between the first sliding end 136*b* and the first sliding portion 132*a* is less than a distance between the first sliding end 136*b* and the first pivot end 136*a*) and the first pivot end 136*a* is away from the first sliding portion 132*a* (i.e., a distance between the second sliding end 138*b* and the second sliding portion 132*b* is less than a distance between the second sliding end 138*b* and the second pivot end 138*a*). In this way, the first sliding end 136*b* and the second sliding end 138*b* respectively adjacent to the left and right ends of the second bracket 134 can reliably assist the left and right ends of the second bracket 134 to slide synchronously.

In this embodiment, the second bracket 134 is provided with a first convex post 134*c* and a second convex post 134*d*. Correspondingly, the first bracket 132 is provided with a first sliding slot 132*c* and a second sliding slot 132*d*; the first sliding end 136*b* of the first connecting rod 136 is provided with a third sliding slot 136*b*1; and the second sliding end 138*b* of the second connecting rod 138 is provided with a fourth sliding slot 138*b*1. The first convex post 134*c* is inserted to the first sliding slot 132*c* and the third sliding slot 136*b*1, and the second convex post 134*d* is inserted to the second sliding slot 132*d* and the fourth sliding slot 138*b*1. Accordingly, the first sliding end 136*b* of the first connecting rod 136 can be slidably disposed on the first bracket 132 and connected to the second bracket 134, and the second sliding end 138*b* of the second connecting rod 138 can be slidably disposed on the first bracket 132 and connected to the second bracket 134.

Referring to FIG. 2 and FIG. 5A, the elevator assembly 130 of this embodiment further includes an elastic component 133, and the elastic component 133 is, for example, an expansion spring and connected between the first connecting rod 136 and the second connecting rod 138. The second bracket 134 can be positioned at a first position shown in FIG. 4A and FIG. 5A or a second position shown in FIG. 4C and FIG. 5C through an elastic force of the elastic component 133 and can resist the elastic force of the elastic component 133 to move to a third position shown in FIG. 4B and FIG. 5B between the first position and the second position. Accordingly, when the user applies force on the second bracket 134 so it moves towards the first position or the third position, the elastic force of the elastic component 133 will drive the second bracket 134 to completely move to the first position or the third position.

Furthermore, in this embodiment, a first cylinder 136*c* is provided on the first connecting rod 136, and a second cylinder 138*c* is provided on the second connecting rod 138. Correspondingly, the first bracket 132 is provided with two arc slots 132*e*, and the first cylinder 136*c* and the second cylinder 138*c* are respectively inserted to the two arc slots 132*e* and respectively connected to two opposite ends of the elastic component 133. In other embodiments, the elastic component 133 can be connected between the first connecting rod 136 and the second connecting rods 138 by other methods, which are not limited by the invention.

Figure 6:
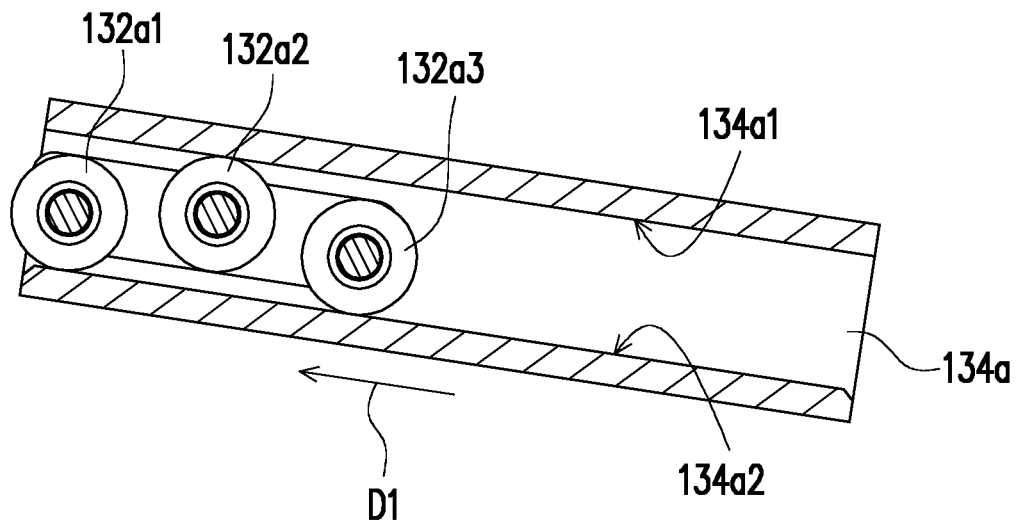
FIG. 6 illustrates a partial structure of the elevator assembly of FIG. 2.

In this embodiment, as shown in FIG. 2, two sliding rails 134*a* are respectively provided at two ends of the second bracket 134, and the first sliding portion 132*a* and second sliding portion 132*b* are respectively slidably disposed on the two sliding rails 134*a*. FIG. 6 illustrates a partial structure of the elevator assembly of FIG. 2. Specifically, as shown in FIG. 6, the first sliding portion 132*a* includes a plurality of rollers (three rollers 132*a*1, 132*a*2 and 132*a*3 are illustrated), the corresponding sliding rail 134*a* has a first inner wall 134*a*1 and a second inner wall 134*a*2 opposite to each other. The roller 132*a*2 contacts the inner wall 134*a*1 and has a distance from the second inner wall 134*a*2, and the rollers 132*a*1 and 132*a*3 contact the second inner wall 134*a*2 and have a distance from the first inner wall 134*a*1. That is, each roller only contacts one of the first inner wall 134*a*1 and the second inner wall 134*a*2 instead of both the first inner wall 134*a*1 and the second inner wall 134*a*2. Accordingly, when the first sliding portion 132*a* moves relative to the slide rail 134*a* so that each roller rolls along the inner wall contacted by the roller, each roller will not contact the other inner wall to generate resistance. The configuration and operation mode of the second sliding portion 132*b* are the same or similar to the configuration and operation mode of the first sliding portion 132*a*, and the description will not be repeated here.

Figure 7:
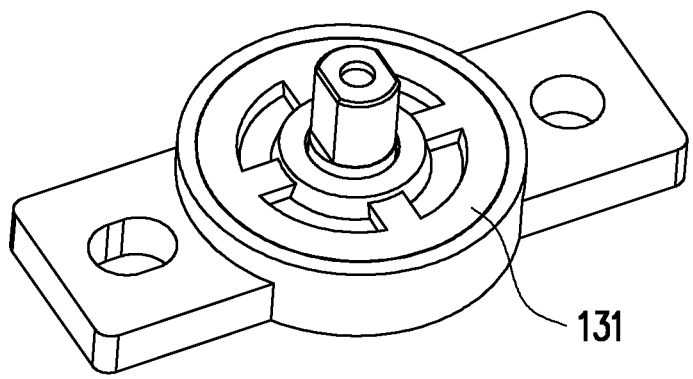
FIG. 7 is a 3D view of a damper bearing of FIG. 2.

FIG. 7 is a 3D view of a damper bearing of FIG. 2. Referring to FIG. 2, FIG. 3 and FIG. 7, the elevator assembly 130 of this embodiment further includes a damper bearing 131. The damper bearing 131 is connected between the first pivot end 136*a* and the first bracket 132, so that the rotation of the first pivot end 136*a* and the second pivot end 138*a* linked therewith is smoother. In other embodiments, the damper bearing 131 may be connected between the second pivot end 138*a* and the first bracket 132 instead, and the invention is not limited thereto.

Figure 8A:
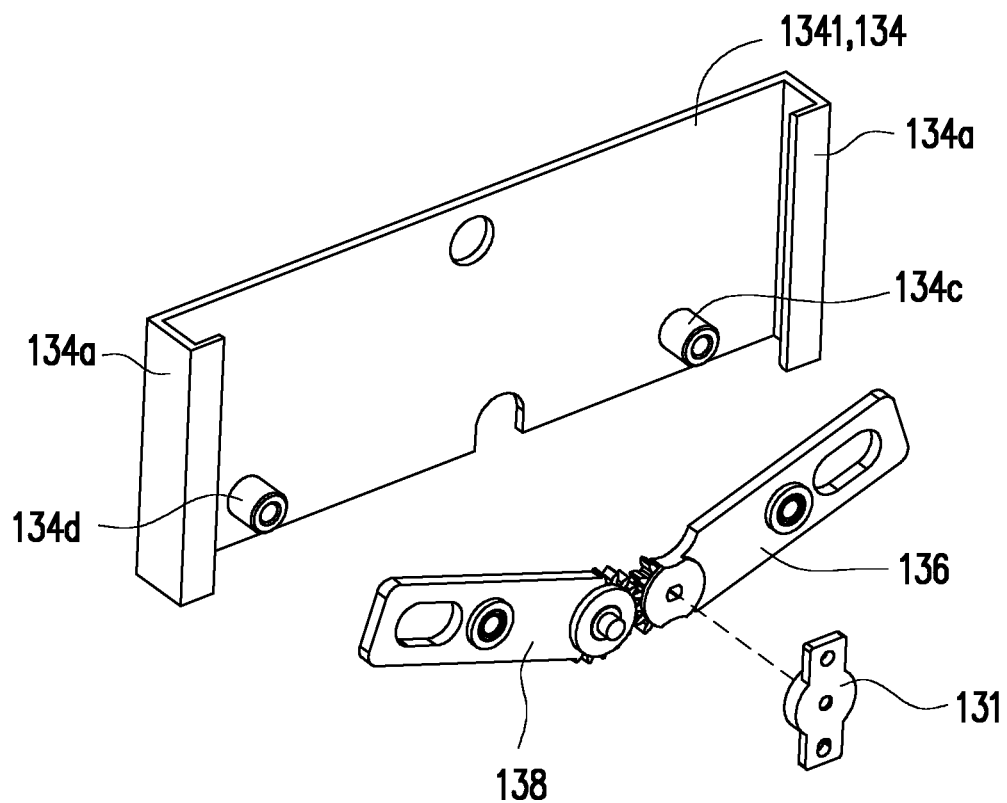
FIG. 8A to FIG. 8F illustrate the assembly process of the elevator of FIG. 1.
Figure 8B:
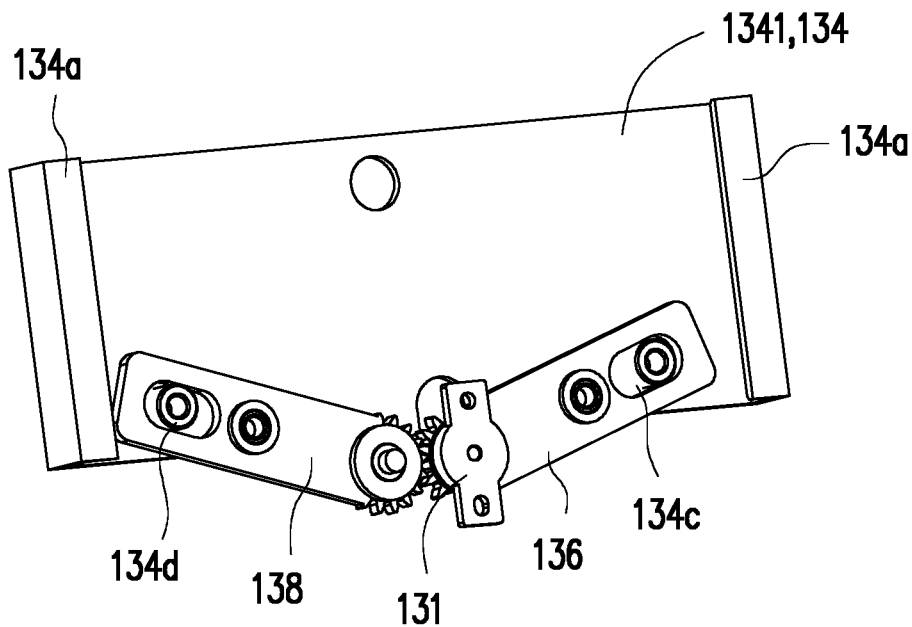
Figure 8C:
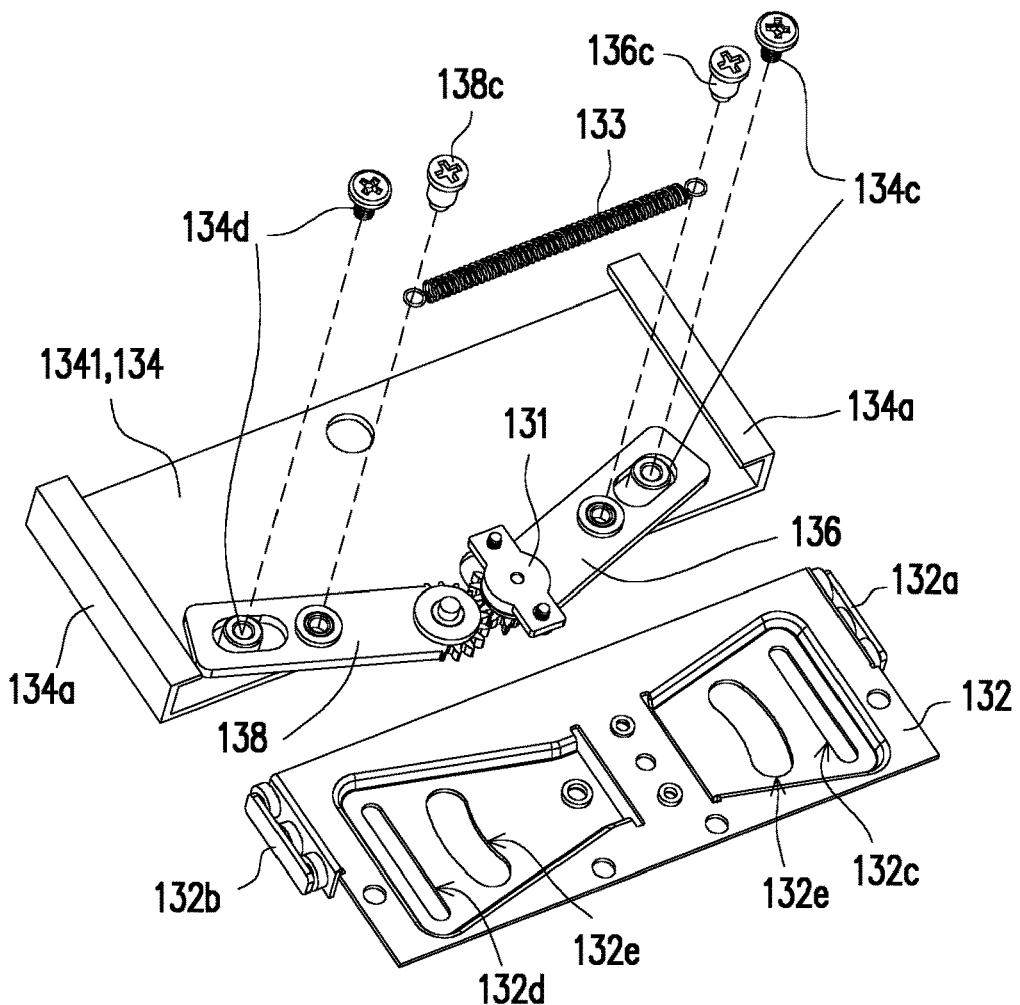
Figure 8D:
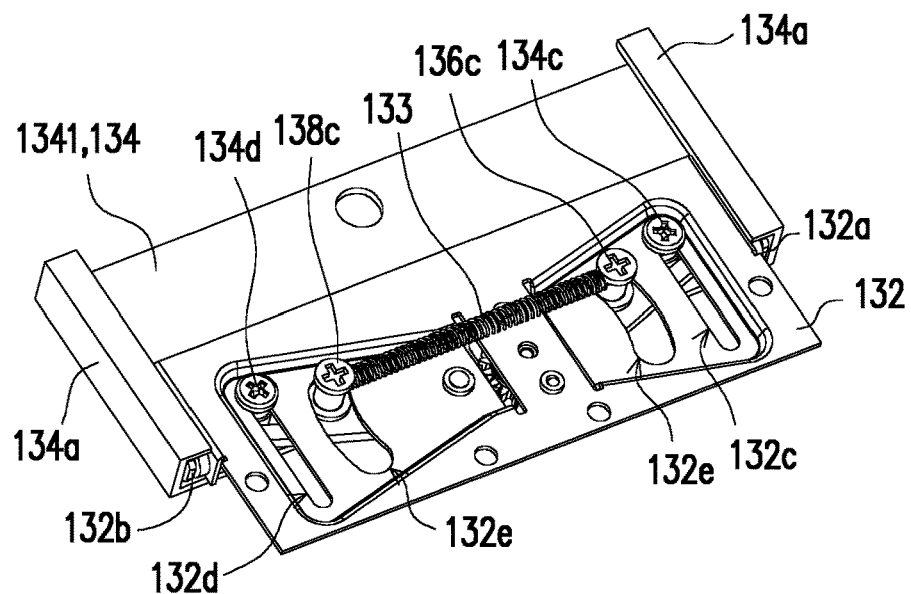
Figure 8E:
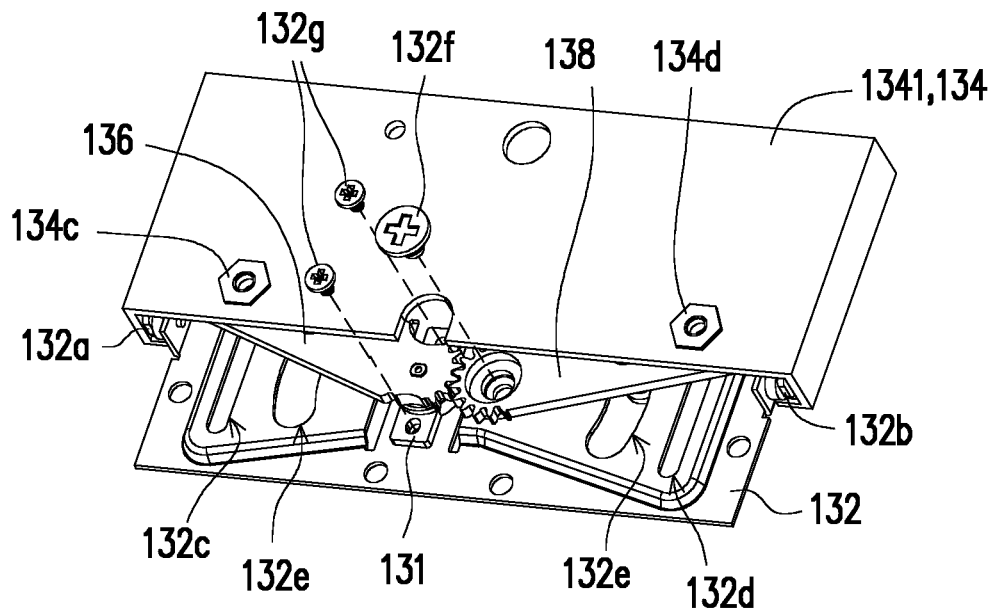
Figure 8F:
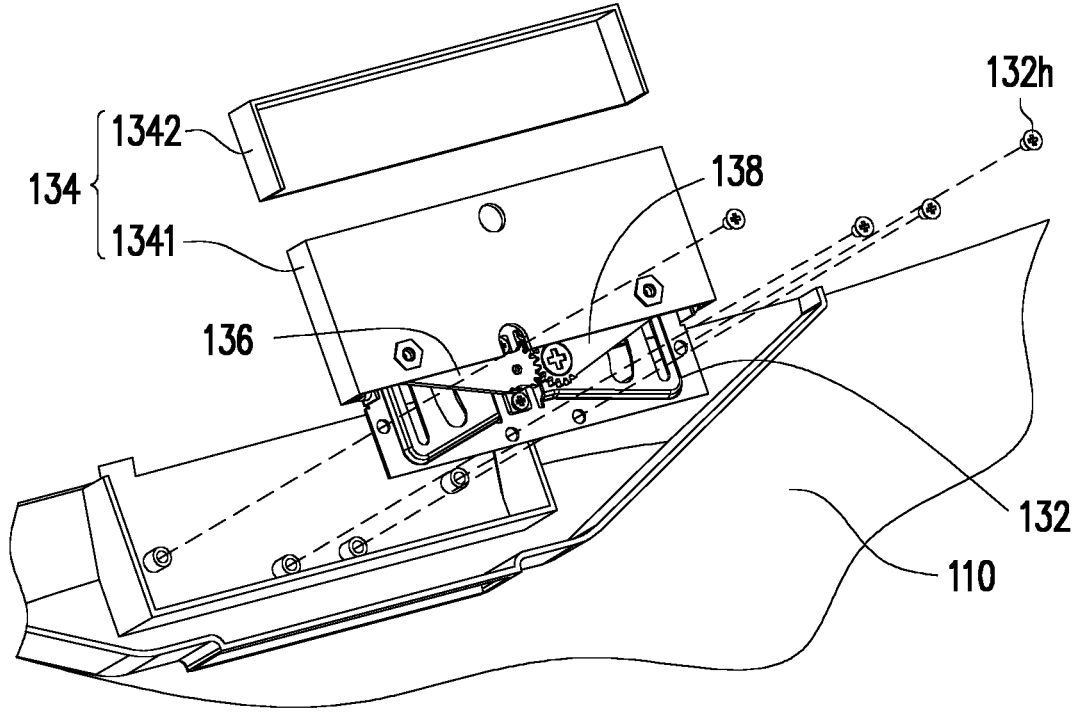

The following illustrates the assembling method of an elevator mechanism of this embodiment by using the drawings as an example. FIG. 8A to FIG. 8F illustrate the assembly process of the elevator of FIG. 1. First of all, as shown in FIG. 8A and FIG. 8B, the first connecting rod 136, the second connecting rod 138 and the damper bearing 131 are assembled on a main body 1341 of the second bracket 134. Next, as shown in FIG. 8C and FIG. 8D, the first sliding portion 132*a* and the second sliding portion 132*b* of the first bracket 132 are slid into the sliding rails 134*a* of the second bracket 134, and the first bracket 132, the second bracket 134, the first connecting rod 136, the second connecting rod 138 and the elastic component 133 are connected through the first convex post 134c, the second convex post 134d, the first cylinder 136c and the second cylinder 138c. Here, the first convex post 134c, the second convex post 134d, the first cylinder 136c and the second cylinder 138c may include screw and boss. As shown in FIG. 8E, the damper bearing 131 may be connected to the first bracket 132 through a locking piece 132g, and the second connecting rod 138 may be connected to the first bracket 132 through locking pieces 132f and 132g, so as to complete the elevator assembly 130 shown in FIG. 2. Here, the locking pieces may include screw and boss. Then, as shown in FIG. 8F, a back cover 1342 of the second bracket 134 is assembled on the main body 1341 of the second bracket 134, and the first bracket 132 is connected to the device body 110 through a locking piece 132h.

Figure 9:
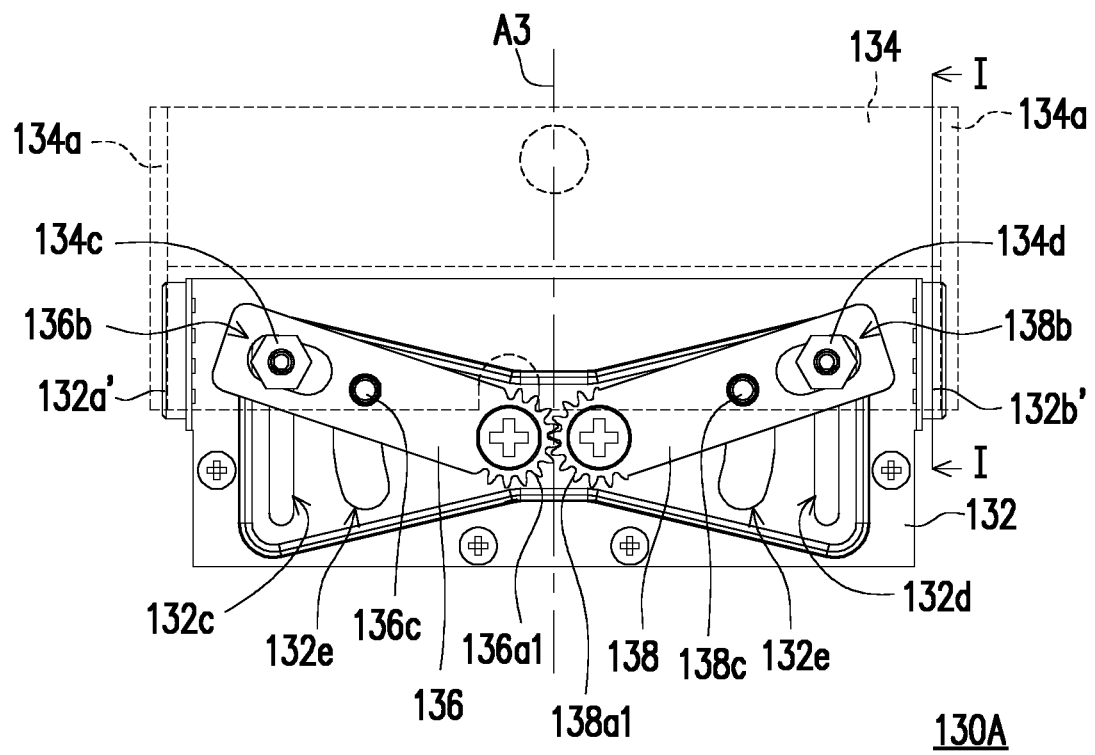
FIG. 9 is a front view of an elevator assembly according to another embodiment of the invention.
Figure 10:
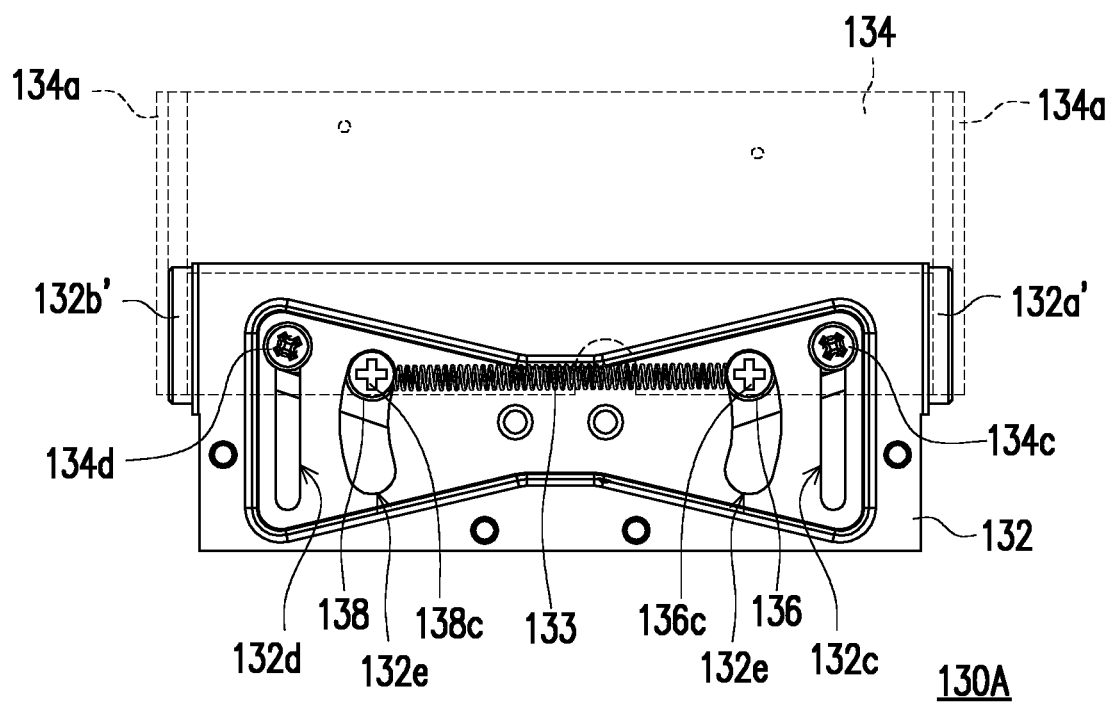
FIG. 10 is a back view of the elevator assembly of FIG. 9.
Figure 11:
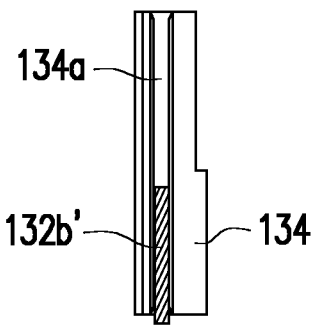
FIG. 11 is a cross-sectional view of the elevator assembly of FIG. 9 along line I-I.

FIG. 9 is a front view of an elevator assembly according to another embodiment of the invention. FIG. 10 is a back view of the elevator assembly of FIG. 9. FIG. 11 is a cross-sectional view of the elevator assembly of FIG. 9 along line I-I. The difference between the embodiment shown in FIG. 9 to FIG. 11 and the foregoing embodiment is that in an elevator assembly 130A shown in FIG. 9 to FIG. 11, a first sliding portion 132a' and a second sliding portion 132a' of the first bracket 132 are sliding blocks instead of the rollers. In addition, in the elevator assembly 130A shown in FIG. 9 to FIG. 11, the damping bearing 131 is omitted. By omitting the arrangement of the rollers and the damping bearing, the cost of the device can be reduced.

Figure 12A:
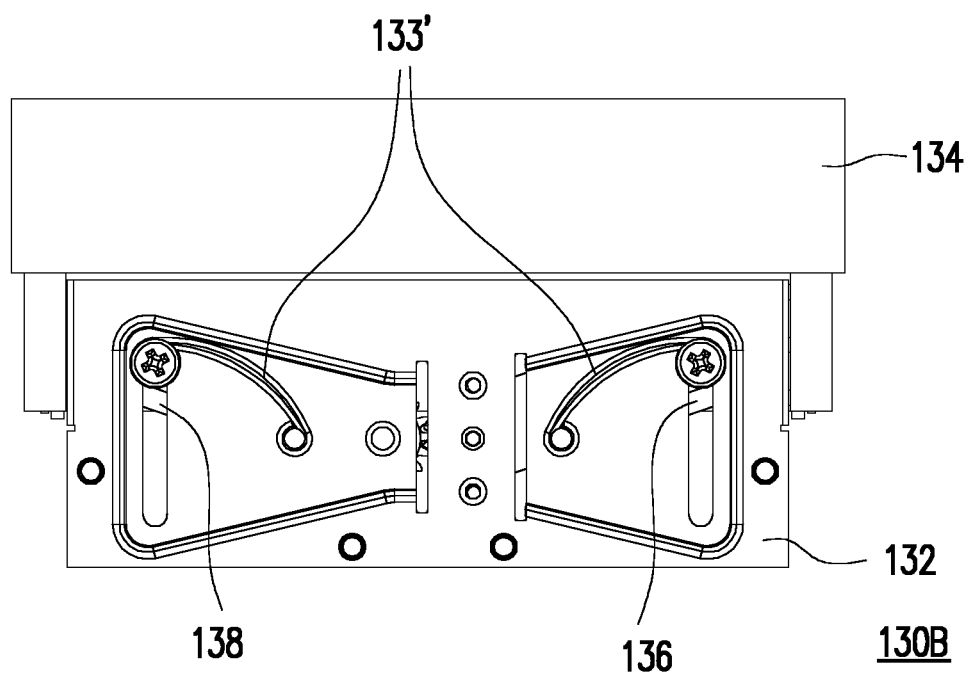
FIG. 12A and FIG. 12B illustrate an operating process of an elevator assembly according to another embodiment of the invention.
Figure 12B:
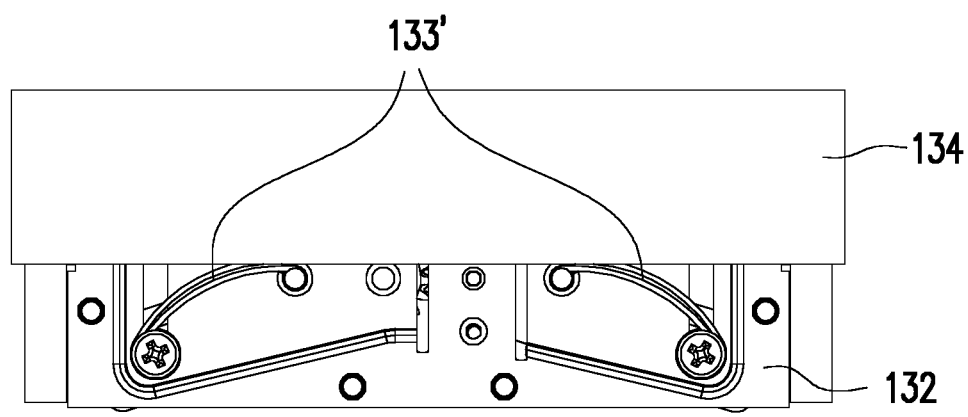

FIG. 12A and FIG. 12B illustrate an operating process of an elevator assembly according to another embodiment of the invention. The difference between the embodiment shown in FIG. 12A and FIG. 12B and the foregoing embodiments is that in an elevator assembly 130B shown in FIG. 12A and FIG. 12B, two elastic components 133' are used to replace the single one elastic component 133 in the foregoing embodiments. The elastic components 133' are, for example, compression springs. One of the elastic components 133' is connected between the first connecting rod 136 and the first bracket 132; and the other one of the elastic components 133' is connected between the second connecting rod 138 and the first bracket 132. The second bracket 134 can be positioned at a first position shown in FIG. 12A or a second position shown in FIG. 12B through elastic forces of the two elastic components 133' and can resist the elastic forces of the two elastic components 133' to move to a third position between the first position and the second position.

More specifically, one end of each of the two elastic components 133' of this embodiment closer to the third axis A3 is fixed on the first bracket 132, and other ends are respectively disposed on the first convex post 134c and the second convex post 134d. Accordingly, the elastic forces of the two elastic components 133' will drive the first connecting rod 136 and the second connecting rod 138 to completely move the second bracket 134 to the first position or the second position.

Figure 13A:
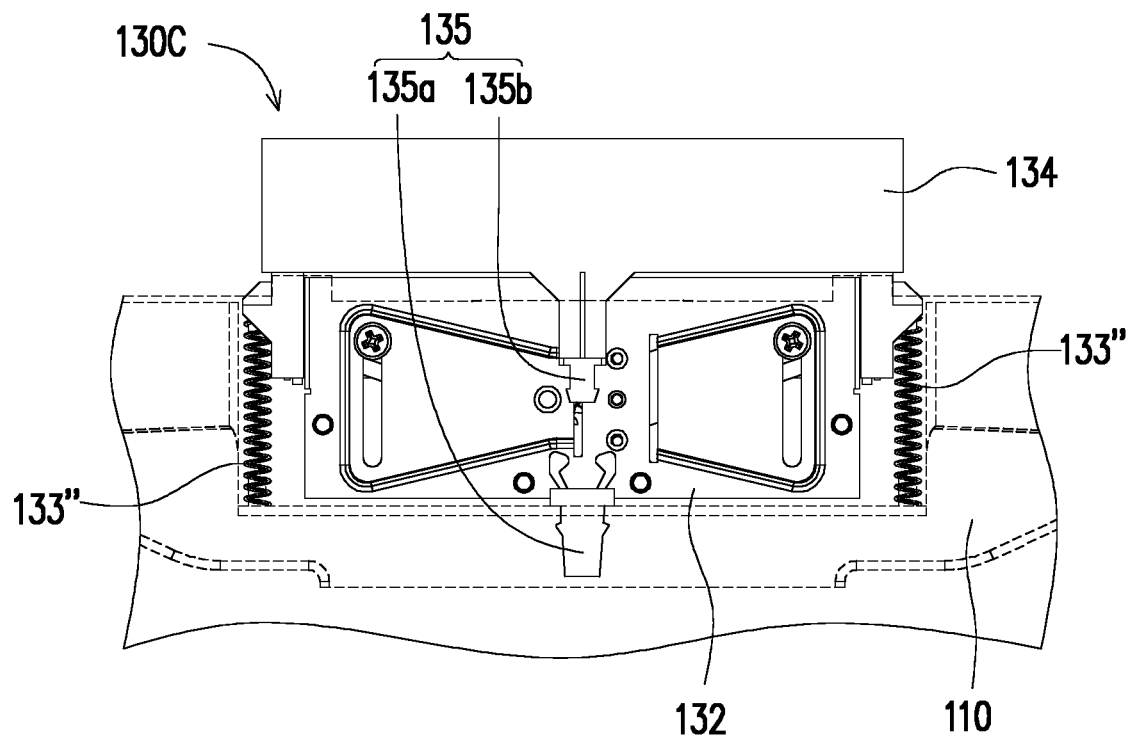
FIG. 13A and FIG. 13B illustrate an operating process of an elevator assembly according to another embodiment of the invention.
Figure 13B:
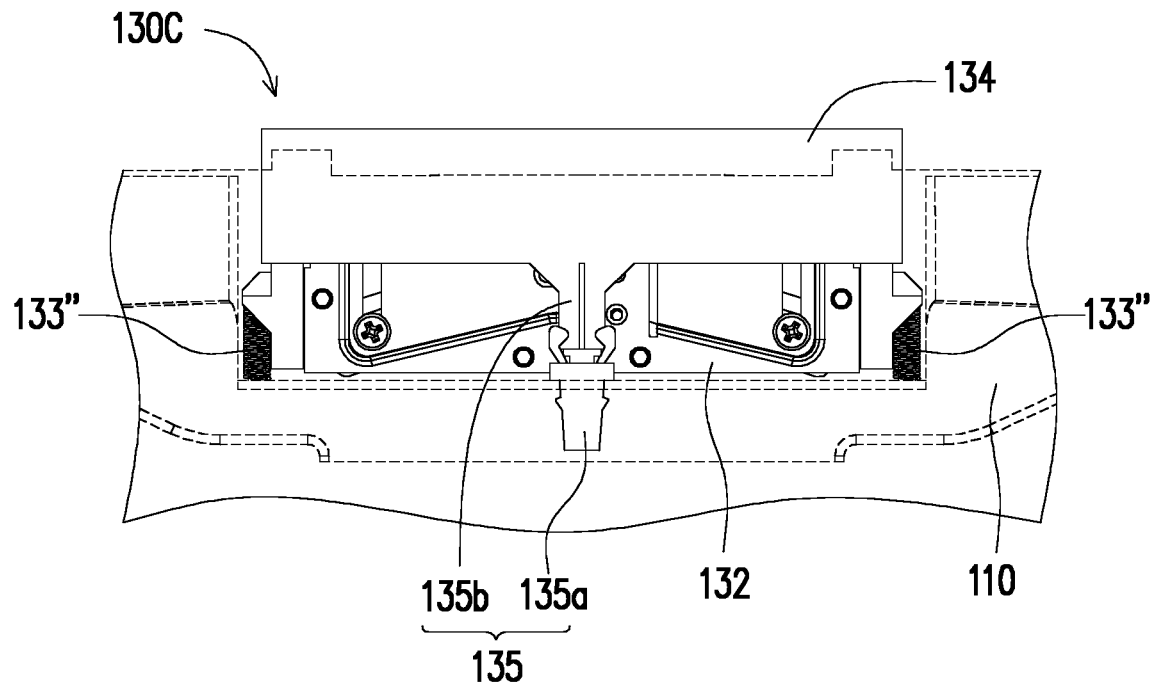

FIG. 13A and FIG. 13B illustrate an operating process of an elevator assembly according to another embodiment of the invention. The difference between the embodiment shown in FIG. 13A and FIG. 13B and the foregoing embodiments is that an elevator assembly 130C shown in FIG. 13A and FIG. 13B does not include the elastic components 133 and 133' of the foregoing embodiments, and the elevator assembly 130C further includes a push-push mechanism 135. The push-push mechanism 135 includes a locking piece 135a and a latch 135b. The locking piece 135a is disposed on the device body 110, and the latch 135b is disposed on the second bracket 134. The second bracket 134 is adapted to be positioned at the first bracket 132 as shown in FIG. 13B by the locking of the locking piece 135a on the latch 135b. The elevator assembly 130C further includes two elastic components 133". The user can press the second bracket 134 to drive the locking piece 135a to release the latch 135b and the second bracket 134. At this time, the second bracket 134 slides relative to the first bracket 132 from a position shown in FIG. 13B to a position shown in FIG. 13A through the elastic forces of the elastic components 133".

The invention claimed is:

1. An elevator assembly, comprising:
a first bracket;
a second bracket, slidably disposed on the first bracket;
a first connecting rod, having a first pivot end and a first sliding end, wherein the first pivot end is pivoted to the first bracket and provided with a first gear portion, and the first sliding end is slidably disposed on the first bracket and connected to the second bracket; and
a second connecting rod, having a second pivot end and a second sliding end, wherein the second pivot end is pivoted to the first bracket and provided with a second gear portion, the second sliding end is slidably disposed on the second bracket and connected to the second bracket, and the first gear portion and the second gear portion are engaged with each other.

2. The elevator assembly of claim 1, wherein a first sliding portion and a second sliding portion are respectively provided at two ends of the first bracket, the second bracket is slidably disposed on the first sliding portion and the second sliding portion, the first connecting rod is located between the first sliding portion and the second connecting rod, and the second connecting rod is located between the second sliding portion and the first connecting rod.

3. The elevator assembly of claim 2, wherein the first sliding end is adjacent to the first sliding portion and located between the first sliding portion and the first pivot end, and the second sliding end is adjacent to the second sliding portion and located between the second sliding portion and the second pivot end.

4. The elevator assembly of claim 2, wherein two sliding rails are respectively provided at two ends of the second bracket, the first sliding portion and the second sliding portion are respectively slidably disposed on the two sliding rails, at least one of the first sliding portion and the second sliding portion comprises a plurality of rollers, the corresponding sliding rail has a first inner wall and a second inner wall opposite to each other, a part of the rollers contacts the first inner wall and has a distance from the second inner wall, and another part of the rollers contacts the second inner wall and has a distance from the first inner wall.

5. The elevator assembly of claim 1, further comprising: a damper bearing, wherein the damper bearing is connected between the first pivot end and the first bracket.

6. The elevator assembly of claim 1, wherein the second bracket is provided with a first convex post and a second convex post, the first bracket is provided with a first sliding slot and a second sliding slot, the first sliding end of the first connecting rod is provided with a third sliding slot, the second sliding end of the second connecting rod is provided with a fourth sliding slot, the first convex post is inserted to the first sliding slot and the third sliding slot, and the second convex post is inserted to the second sliding slot and the fourth sliding slot.

7. The elevator assembly of claim 1, further comprising: an elastic component, wherein the elastic component is connected between the first connecting rod and the second connecting rod, and the second bracket is adapted to be positioned at a first position or a second position through an elastic force of the elastic component and adapted to resist the elastic force of the elastic component to move to a third position between the first position and the second position.

8. The elevator assembly of claim 7, wherein a first cylinder is provided on the first connecting rod, a second cylinder is provided on the second connecting rod, the first bracket is provided with two arc slots, and the first cylinder and the second cylinder are respectively inserted to the two arc slots and respectively connected to two opposite ends of the elastic component.

9. The elevator assembly of claim 1, further comprising: two elastic components, wherein one of the elastic components is connected between the first connecting rod and the first bracket, the other one of the elastic components is connected between the second connecting rod and the first bracket, and the second bracket is adapted to be positioned at a first position or a second position through elastic forces of the two elastic components and adapted to resist the elastic forces of the two elastic components to move to a third position between the first position and the second position.

10. The elevator assembly of claim 1, further comprising: a push-push mechanism and at least one elastic component, wherein the push-push mechanism is partially disposed on the second bracket, and the second bracket is adapted to be positioned at the first bracket through the push-push mechanism, wherein the at least one elastic component is connected to the second bracket, and when the push-push mechanism releases the second bracket, the second bracket is adapted to slide relative to the first bracket through an elastic force of the at least one elastic component.

11. An electronic device, comprising:
 a device body;
 an image capturing unit; and
 an elevator assembly, comprising:
  a first bracket, disposed on the device body;
  a second bracket, slidably disposed on the first bracket, wherein the image capturing unit is disposed on the second bracket;
  a first connecting rod, having a first pivot end and a first sliding end, wherein the first pivot end is pivoted to the first bracket and provided with a first gear portion, and the first sliding end is slidably disposed on the first bracket and connected to the second bracket; and
  a second connecting rod, having a second pivot end and a second sliding end, wherein the second pivot end is pivoted to the first bracket and provided with a second gear portion, the second sliding end is slidably disposed on the second bracket and connected to the second bracket, and the first gear portion and the second gear portion are engaged with each other.

12. The electronic device of claim 11, wherein a first sliding portion and a second sliding portion are provided at two ends of the first bracket, the second bracket is slidably disposed on the first sliding portion and the second sliding portion, the first connecting rod is located between the first sliding portion and the second connecting rod, and the second connecting rod is located between the second sliding portion and the first connecting rod.

13. The electronic device of claim 12, wherein the first sliding end is adjacent to the first sliding portion and located between the first sliding portion and the first pivot end, and the second sliding end is adjacent to the second sliding portion and located between the second sliding portion and the second pivot end.

14. The electronic device of claim 12, wherein two sliding rails are respectively provided at two ends of the second bracket, the first sliding portion and the second sliding portion are respectively slidably disposed on the two sliding rails, at least one of the first sliding portion and the second sliding portion comprises a plurality of rollers, the corresponding sliding rail has a first inner wall and a second inner wall opposite to each other, a part of the rollers contacts the first inner wall and has a distance from the second inner wall, and another part of the rollers contacts the second inner wall and has a distance from the first inner wall.

15. The electronic device of claim 11, wherein the elevator assembly further comprises a damper bearing, and the damper bearing is connected between the first pivot end and the first bracket.

16. The electronic device of claim 11, wherein the second bracket is provided with a first convex post and a second convex post, the first bracket is provided with a first sliding slot and a second sliding slot, the first sliding end of the first connecting rod is provided with a third sliding slot, the second sliding end of the second connecting rod is provided with a fourth sliding slot, the first convex post is inserted to the first sliding slot and the third sliding slot, and the second convex post is inserted to the second sliding slot and the fourth sliding slot.

17. The electronic device of claim 11, wherein the elevator assembly further comprises an elastic component, the elastic component is connected between the first connecting rod and the second connecting rod, and the second bracket is adapted to be positioned at a first position or a second position through an elastic force of the elastic component and adapted to resist the elastic force of the elastic component to move to a third position between the first position and the second position.

18. The electronic device of claim 17, wherein a first cylinder is provided on the first connecting rod, a second cylinder is provided on the second connecting rod, the first bracket is provided with two arc slots, and the first cylinder and the second cylinder are respectively inserted to the two arc slots and respectively connected to two opposite ends of the elastic component.

19. The electronic device of claim 11, wherein the elevator assembly further comprises two elastic components, one of the elastic components is connected between the first connecting rod and the first bracket, the other one of the elastic components is connected between the second connecting rod and the first bracket, and the second bracket is adapted to be positioned at a first position or a second position through elastic forces of the two elastic components and adapted to resist the elastic forces of the two elastic components to move to a third position between the first position and the second position.

20. The electronic device of claim 11, wherein the elevator assembly further comprises a push-push mechanism and at least one elastic component, a part of the push-push mechanism is disposed on the second bracket, another part of the push-push mechanism is disposed on the device body, the elevator assembly is adapted to be positioned at the device body through the push-push mechanism, the at least one elastic component is connected to the second bracket, and when the push-push mechanism releases the second bracket, the second bracket is adapted to slide relative to the device body and the first bracket through an elastic force of the at least one elastic component.

* * * * *